United States Patent
Roytman

(10) Patent No.: US 12,079,245 B2
(45) Date of Patent: *Sep. 3, 2024

(54) SYSTEM AND METHOD FOR SUPPORTING LARGE QUERIES IN A MULTIDIMENSIONAL DATABASE ENVIRONMENT

(71) Applicant: ORACLE INTERNATIONAL CORPORATION, Redwood Shores, CA (US)

(72) Inventor: Alexey Roytman, Beer Sheva (IL)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/234,479

(22) Filed: Apr. 19, 2021

(65) Prior Publication Data
US 2021/0240735 A1 Aug. 5, 2021

Related U.S. Application Data

(63) Continuation of application No. 15/333,051, filed on Oct. 24, 2016, now Pat. No. 10,984,020.

(60) Provisional application No. 62/245,892, filed on Oct. 23, 2015, provisional application No. 62/245,901, (Continued)

(51) Int. Cl.
*G06F 7/00* (2006.01)
*G06F 16/00* (2019.01)
*G06F 16/22* (2019.01)
*G06F 16/245* (2019.01)
*G06F 16/28* (2019.01)
*G06F 16/903* (2019.01)

(52) U.S. Cl.
CPC ........ *G06F 16/283* (2019.01); *G06F 16/2264* (2019.01); *G06F 16/245* (2019.01); *G06F 16/90335* (2019.01)

(58) Field of Classification Search
None
See application file for complete search history.

(56) References Cited

U.S. PATENT DOCUMENTS

| | | |
|---|---|---|
| 7,392,242 B1 | 6/2008 | Baccash |
| 8,037,086 B1 | 10/2011 | Upstill |
| 8,359,305 B1 | 1/2013 | Burke |

(Continued)

OTHER PUBLICATIONS

United States Patent and Trademark Office, Office Action dated Jun. 11, 2021 for U.S. Appl. No. 15/333,022, 10 pages.

(Continued)

*Primary Examiner* — Tuan A Pham
(74) *Attorney, Agent, or Firm* — TUCKER ELLIS LLP

(57) ABSTRACT

In accordance with an embodiment, the system provides support for large queries in a multidimensional database computing environment. A kernel-based data structure, referred to herein as an odometer retriever, or odometer, that manages pointers to data blocks, contains control information, or otherwise operates as an array of arrays of pointers to stored members. When used with a dynamic flow, the approach enables the system to be used, for example to handle grid queries, Multidimensional Expressions (MDX) queries, or other types of queries in which the potential size of the query can be up to $2^{64}$ bits.

20 Claims, 10 Drawing Sheets

Related U.S. Application Data filed on Oct. 23, 2015, provisional application No. 62/245,897, filed on Oct. 23, 2015.

(56) References Cited

U.S. PATENT DOCUMENTS

| | | | |
|---|---|---|---|
| 9,081,830 B1* | 7/2015 | Stolte | G06F 16/24552 |
| 9,348,874 B2 | 5/2016 | Schroetel | |
| 9,524,331 B2 | 12/2016 | Nair | |
| 9,600,554 B2 | 3/2017 | Gerweck | |
| 10,083,195 B2 | 9/2018 | Zhou | |
| 10,565,176 B2 | 2/2020 | Brodt | |
| 2002/0029207 A1* | 3/2002 | Bakalash | G06F 16/283 |
| 2003/0217075 A1 | 11/2003 | Nakano | |
| 2005/0091206 A1 | 4/2005 | Koukerdjinian | |
| 2005/0094742 A1 | 5/2005 | Yee | |
| 2006/0010156 A1 | 1/2006 | Netz | |
| 2006/0085742 A1* | 4/2006 | Harold | G06F 16/25 |
| | | | 715/249 |
| 2006/0106769 A1* | 5/2006 | Gibbs | G06F 16/951 |
| 2006/0271568 A1 | 11/2006 | Balkir et al. | |
| 2007/0061344 A1* | 3/2007 | Dickerman | G06F 40/18 |
| 2007/0094236 A1 | 4/2007 | Otter | |
| 2008/0201293 A1* | 8/2008 | Grosset | G06F 16/283 |
| 2009/0030915 A1 | 1/2009 | Winter | |
| 2009/0063403 A1 | 3/2009 | Malloy | |
| 2009/0248651 A1 | 10/2009 | Perry et al. | |
| 2009/0307248 A1 | 12/2009 | Moser | |
| 2012/0110583 A1* | 5/2012 | Balko | G06F 9/4843 |
| | | | 718/102 |
| 2012/0331259 A1 | 12/2012 | Fulton | |
| 2013/0097151 A1* | 4/2013 | Cushing | G06F 16/283 |
| | | | 707/E17.014 |
| 2013/0166497 A1 | 6/2013 | Schroetel | |
| 2014/0317156 A1 | 10/2014 | Kanamatareddy | |
| 2015/0026207 A1 | 1/2015 | Bharti | |
| 2015/0074038 A1* | 3/2015 | Sarferaz | G06F 16/283 |
| | | | 707/602 |
| 2015/0120786 A1 | 4/2015 | Slovacek | |
| 2015/0142724 A1 | 5/2015 | Nair | |
| 2015/0278334 A1 | 10/2015 | Gerweck | |
| 2015/0310047 A1 | 10/2015 | Zhou | |

OTHER PUBLICATIONS

United States Patent and Trademark Office, Office Action dated Nov. 23, 2021 for U.S. Appl. No. 15/333,022 , 15 pages.
United States Patent and Trademark Office, Office Action dated Aug. 5, 2021 for U.S. Appl. No. 16/735,448 , 25 pages.
"Dynamic Flow process" definition Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs_I=psy-ab.3... 38876.39886..40199...0.0..0.76.437.8......0....1..gws-wiz.......0i71j0i7i30j0i30j0i8i30.
"Dynamic Flow process" OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs_I=psy-ab.3... 38876.39886..40199...0.0..0.76.437.8......0....1..gws-wiz.......0i71j0i7i30j0i30j0i8i30j33i10.
PerformanceArchHowTo, Aggregate Storage Option ASO vs Block Storage Option BSO Contrast and Comparison Aug. 24, 2011, youtube.com, https://www.youtube.com/watch?v=i8AeH5UGT90.
Oracle, EPM Information Development Team, Oracle® Essbase Release 11.1.1, Database Administrator's Guide, Copyright@ 1996, 2008, 1182 pages.
"DBMS Indexing", captured by archive on Jan. 17, 2014, https://web.archive.org/web/20140117034636/https://www.tutorialspoint.com/dbms/dbms_indexing.htm, 5 pages.
Russakovsky, Alexander, "Hopping over Big Data: Accelerating Ad-hoc OLAP Queries with Grasshopper Algorithms", published Feb. 26, 2015, 30 pages.
Crisan, Dan, "Intro to Database Systems: Indexing Part 2—B+ trees", published Apr. 4, 2015, retrieved from blog.dancrisan.com/intro-to-database-systems-indexing-part-2-b-trees, 8 pages.
Zumbrum, Sarah Craynon, "How Exactly Does Essbase Work? Part 1", RealTriGeek, published Jul. 22, 2014, retrieved from https://realtrigeek.com/2014/07/22/how-exactly-does-essbase-work-part-i/, 9 pages.
Oracle, EPM Information Development Team, Oracle® Essbase Release 11.1.2.2.100, Database Administrator's Guide, Copyright@ 1996, 2013, Updated 2013, 5 pages.
United States Patent and Trademark Office, Office Action dated Sep. 18, 2019 for U.S. Appl. No. 15/333,022, 9 pages.
United States Patent and Trademark Office, Notice of Allowance dated Sep. 23, 2019 for U.S. Appl. No. 15/332,948, 11 pages.
United States Patent and Trademark Office, Office Action dated Feb. 7, 2020 for U.S. Appl. No. 15/333,022, 14 pages.
United States Patent and Trademark Office, Office Action dated Jul. 2, 2020 for U.S. Appl. No. 15/333,022, 18 pages.
United States Patent and Trademark Office, Office Action dated Nov. 15, 2018 For U.S. Appl. No. 15/332,948, 17 pages.
United States Patent and Trademark Office, Office Action dated Mar. 21, 2019 For U.S. Appl. No. 15/333,022, 13 pages.
United States Patent and Trademark Office, Office Action dated Nov. 30, 2018 For U.S. Appl. No. 15/333,022, 11 pages.
United States Patent and Trademark Office, Office Action dated Jun. 6, 2019 for U.S. Appl. No. 15/332,948, 11 pages.
United States Patent and Trademark Office, Office Action dated Aug. 6, 2019 for U.S. Appl. No. 15/333,022, 7 pages.
United States Patent and Trademark Office, Office Communication dated May 20, 2022 for U.S. Appl. No. 16/735,448 , 19 pages.
United States Patent and Trademark Office, Office Communication dated Aug. 29, 2023 for U.S. Appl. No. 17/992,805 , 28 pages.
United States Patent and Trademark Office, Office Communication dated Feb. 15, 2024 for U.S. Appl. No. 17/992,805 , 26 pages.
United States Patent and Trademark Office, Office Communication dated Dec. 21, 2023 for U.S. Appl. No. 17/992,305 , 18 pages.
United States Patent and Trademark Office, Office Communication dated Apr. 8, 2024 for U.S. Appl. No. 17/992,305 , 15 pages.

\* cited by examiner

SYSTEM AND METHOD FOR SUPPORTING LARGE QUERIES IN A MULTIDIMENSIONAL DATABASE ENVIRONMENT

CLAIM OF PRIORITY AND CROSS-REFERENCE TO RELATED APPLICATIONS

This application is a continuation of and claims the benefit of priority to U.S. patent application entitled "SYSTEM AND METHOD FOR SUPPORTING LARGE QUERIES IN A MULTIDIMENSIONAL DATABASE ENVIRONMENT", application Ser. No. 15/333,051, filed on Oct. 24, 2016, which application claims the benefit of priority to U.S. Provisional application titled "SYSTEM AND METHOD FOR HYBRID SUPPORT FOR DYNAMIC UPPER LEVEL MEMBERS WITH A MULTIDIMENSIONAL DATABASE", Application No. 62/245,892, filed Oct. 23, 2015; U.S. Provisional application titled "SYSTEM AND METHOD FOR HIGH PERFORMANCE BOTTOM-UP AGGREGATION IN A MULTIDIMENSIONAL DATABASE ENVIRONMENT", Application No. 62/245,897, filed Oct. 23, 2015; U.S. Provisional application titled "SYSTEM AND METHOD FOR SUPPORT FOR LARGE QUERIES IN A MULTIDIMENSIONAL DATABASE ENVIRONMENT", Application No. 62/245,901, filed Oct. 23, 2015; and is related to U.S. patent application titled "SYSTEM AND METHOD FOR USE OF A DYNAMIC FLOW IN A MULTIDIMENSIONAL DATABASE ENVIRONMENT", application Ser. No. 15/332,948, filed Oct. 24, 2016; and U.S. patent application titled "SYSTEM AND METHOD FOR PROVIDING BOTTOM-UP AGGREGATION IN A MULTIDIMENSIONAL DATABASE ENVIRONMENT", application Ser. No. 15/333,022, filed Oct. 24, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to multidimensional database computing environments, and are particularly related to a system and method for supporting large queries in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, the system provides support for large queries in a multidimensional database (e.g., Essbase) computing environment. A kernel-based odometer retriever, or odometer that manages pointers to data blocks, contains control information, or otherwise acts as an array of arrays of pointers to stored members. When used with a dynamic flow, the approach enables the system to be used, for example to handle grid queries, Multidimensional Expressions (MDX) queries, or other types of queries in which the potential size of the query can be up to $2^{64}$ bits.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
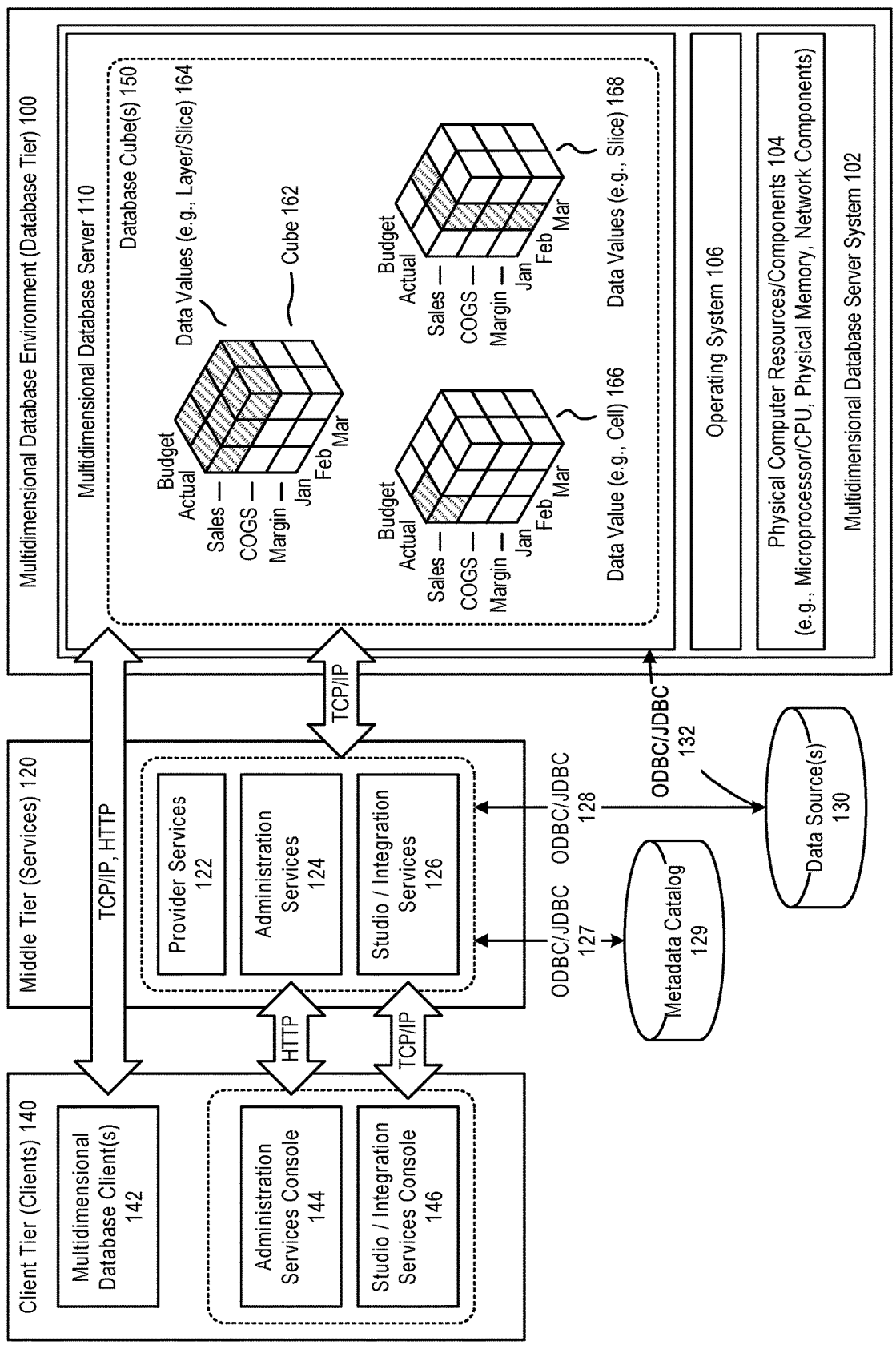
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Dynamic Flow

In accordance with an embodiment, the system supports the use of a dynamic flow (referred to herein in some examples as Query Processing Dynamic Flow (QPDF)) in a multidimensional database (e.g., Essbase) computing environment. The dynamic flow process enables hybrid use of, for example, Aggregate Storage Option (ASO), Block Storage Option (BSO), or other types of storage containers, and provides a common flow to process a received input query in bottom-up mode. The approach can be used to reduce the size of the cube, which provides for efficient calculation of dynamic members.

For example, in accordance with an embodiment, for queries accessing dynamic sparse members, the system can use an aggregate storage engine to satisfy the request. For queries that cannot be processed by the aggregate storage engine, the system can employ a block storage engine to satisfy the request, including for example bringing the data into an aggregate storage temporary tablespace.

For example, in accordance with an embodiment, when executed by a computer system, the dynamic flow process can operate upon a multidimensional database to: (1) expand an input query to find all base/calculated data; (2) analyze the expanded query to find dependencies and an order of calculation; (3) define calculation units according to the preceding steps; (4) build a processing flow with the defined calculation units, and connect them; and (5) execute the processing flow, and determine a response to the input query.

Figure 2:
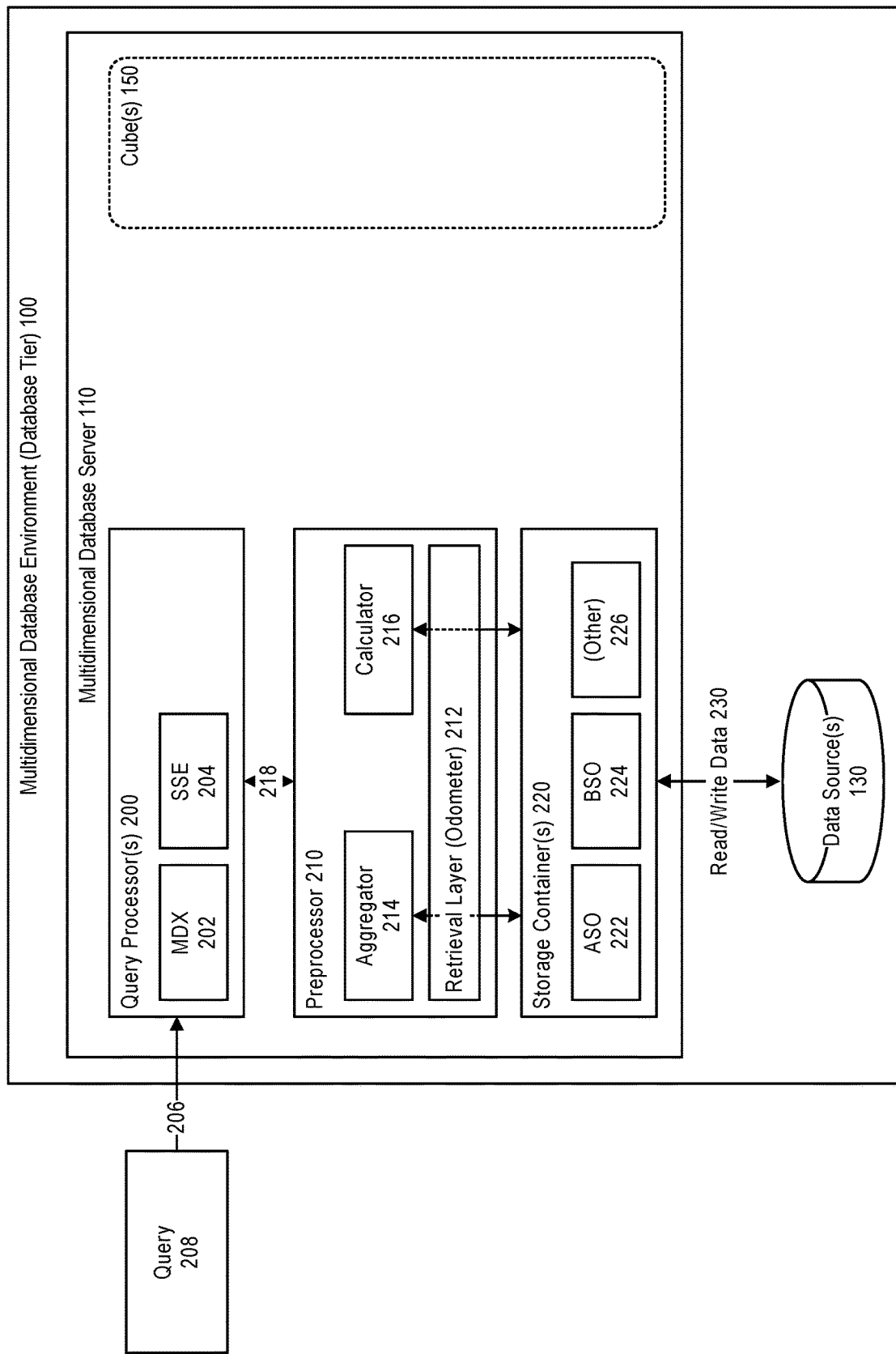
FIG. 2 illustrates use of a dynamic flow with a multidimensional database, in accordance with an embodiment.

FIG. 2 illustrates use of a dynamic flow with a multidimensional database, in accordance with an embodiment.

In a typical multidimensional environment, in order to prepare the system to respond to input queries, the database server pre-calculates values for certain dimensions, and stores those pre-calculated values in the cube for later lookup.

In accordance with an embodiment, when a dynamic flow is instead used, the ability to support dynamic query processing enables the database server to avoid pre-calculating and storing such values, which improves performance and reduces the storage of potentially empty cells.

As illustrated in FIG. 2, in accordance with an embodiment, the system can include one or more query processor(s) 200, for example a Multidimensional Expressions (MDX) query processor 202, and/or a SpreadSheet Extractor (SSE) 204 query processor, that enable receipt 206 of an input query 208 from a client, to retrieve, access, or otherwise examine a set of data from a data source, as provided by and made accessible via the multidimensional database.

In accordance with an embodiment, a preprocessor component 210 can include a data retrieval layer 212 or data fetching component (which in some environments can incorporate a kernel-based odometer retriever, or odometer or data structure stored in memory that manages pointers to data blocks, contains control information, or otherwise acts as an array of arrays of pointers to stored members), an aggregator component 214, and a calculator component 216, each of these layers and components can be provided as a software or program code that is executable by a computer system.

Generally, described, in accordance with an embodiment, the preprocessor receives 218 input queries, from the one or more query processor(s), for processing against the multidimensional database. The aggregator is adapted to perform hierarchical aggregations of the data. The calculator is adapted to perform calculations on the data, and to cooperate with the aggregator, as further described below, to utilize the data retrieval layer (including an odometer as appropriate) to at least one of populate and/or search within a cube, and to process a response to an input query.

In accordance with an embodiment, the system can include one or more storage container(s) 220, such as, for example, one or more of an Aggregate Storage Option (ASO) 222, Block Storage Option (BSO) 224, or other type of storage container 226, each of which storage containers can act as an interface between the data that is read from/written to 230 the data source or multidimensional database, and whichever data might be needed for aggregation and calculation at the preprocessor.

Figure 3:
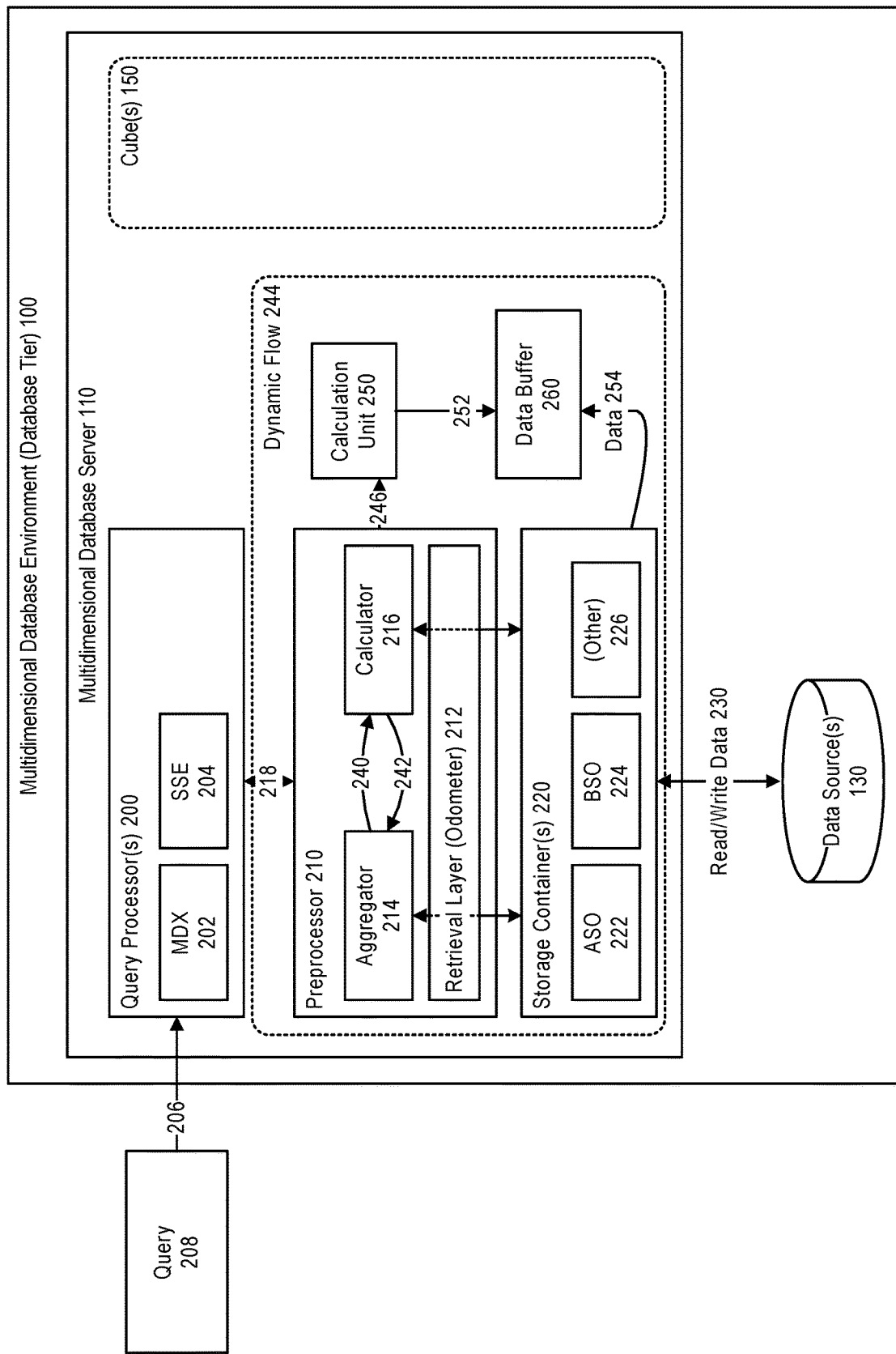
FIG. 3 further illustrates use of a dynamic flow with a multidimensional database, in accordance with an embodiment.

FIG. 3 further illustrates use of a dynamic flow with a multidimensional database, in accordance with an embodiment.

As illustrated in FIG. 3, in accordance with an embodiment, in response to the database server receiving an input query, the aggregator can operate 240, 242 in combination with the calculator, to process the query, as part of a dynamic flow 244, which can be similarly provided as software or program code that is executable by a computer system.

For example, as illustrated in FIG. 3, the dynamic flow process enables hybrid use of, in this example, one or more ASO, BSO, or other types of storage containers, and provides a common flow to process the query using these storage containers, in a bottom-up mode.

In accordance with an embodiment, when the system begins to process an input query, it first determines, from an examination of the input query, which particular data or other information needs to be retrieved, i.e., a metadata. The system can then define 246 for that input query, an initial calculation unit 250, which encapsulates an aggregation/calculation process that will retrieve a set of data from the storage container(s).

In accordance with an embodiment, a data buffer 260 (referred to herein, in some examples, as one or more output buckets) operates as a data structure into which each calculation unit can read/write data 252, and which allows for a temporary storage of the data received from 254 the storage container(s), for consumption by calculation unit(s).

In accordance with an embodiment, when the dynamic flow is used with a BSO-type storage container, the dynamic flow process performs a pre-analysis of an input query, and an expansion of asked points to its base data.

However, the amount of such expanded base data may be quite large.

To address this, and to reduce the volume of expanded data, in accordance with an embodiment, a first dynamic aggregation can be performed during the fetching of data from the kernel, without a full expansion of the associated kernel structure (such as, for example, a kernel-side odometer as described above).

In accordance with an embodiment, the dynamic flow then operates to expand the input query, to find all base/calculated data; and to analyze the expanded query to find dependencies and an order of calculation.

Figure 4:
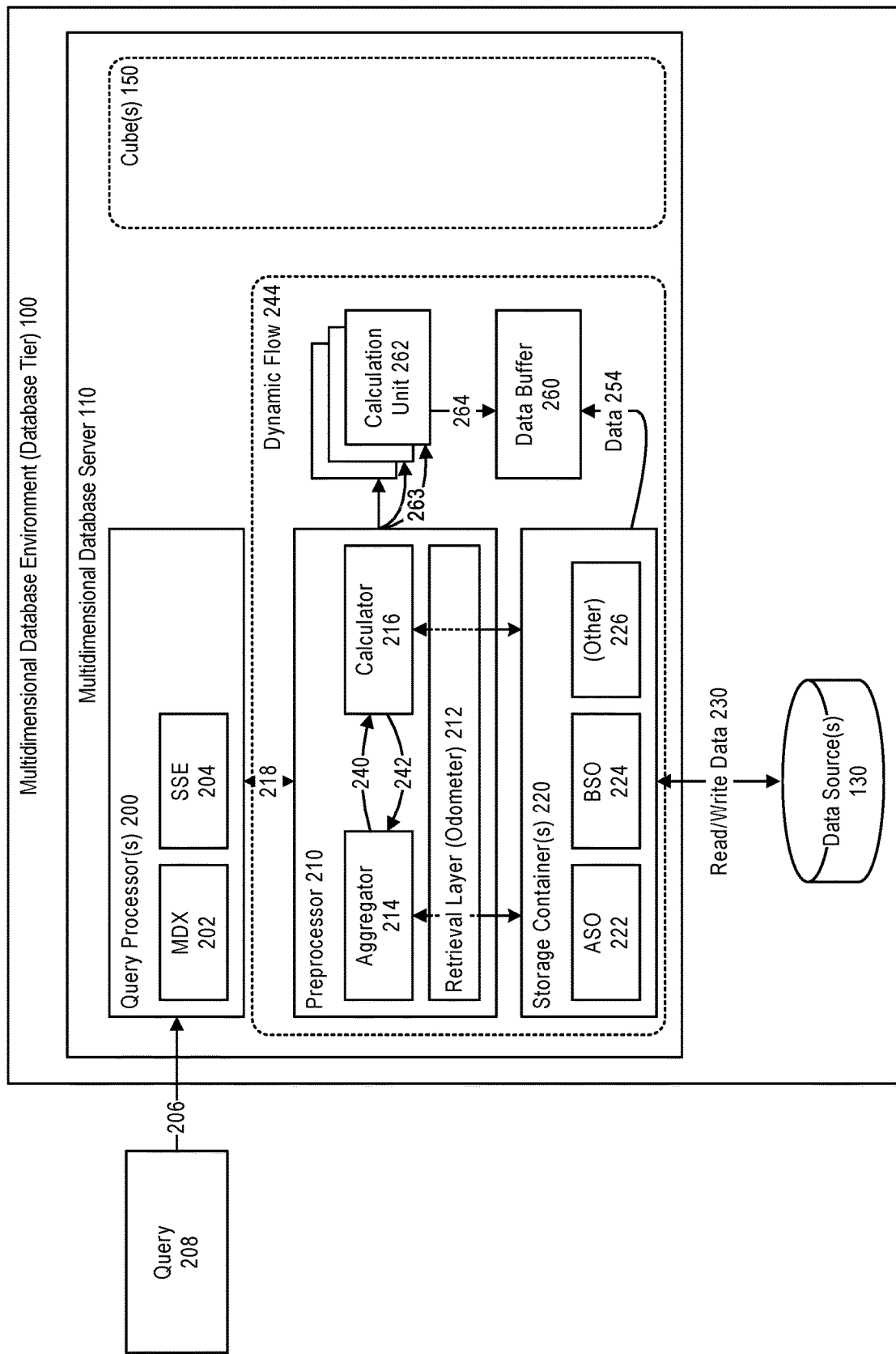
FIG. 4 further illustrates use of a dynamic flow with a multidimensional database, in accordance with an embodiment.

FIG. 4 further illustrates use of a dynamic flow with a multidimensional database, in accordance with an embodiment.

As illustrated in FIG. 4, in accordance with an embodiment, as each subsequent calculation unit 262 is determined by the system as part of a dynamic flow instance, the aggregation/calculation process encapsulated by that calculation unit fills up 263 another output bucket in the data buffer.

In accordance with an embodiment, the dynamic flow process continues defining subsequent calculation units; and then connects the calculation units; and executes the resultant processing flow, to determine a response to the input query.

Figure 5:
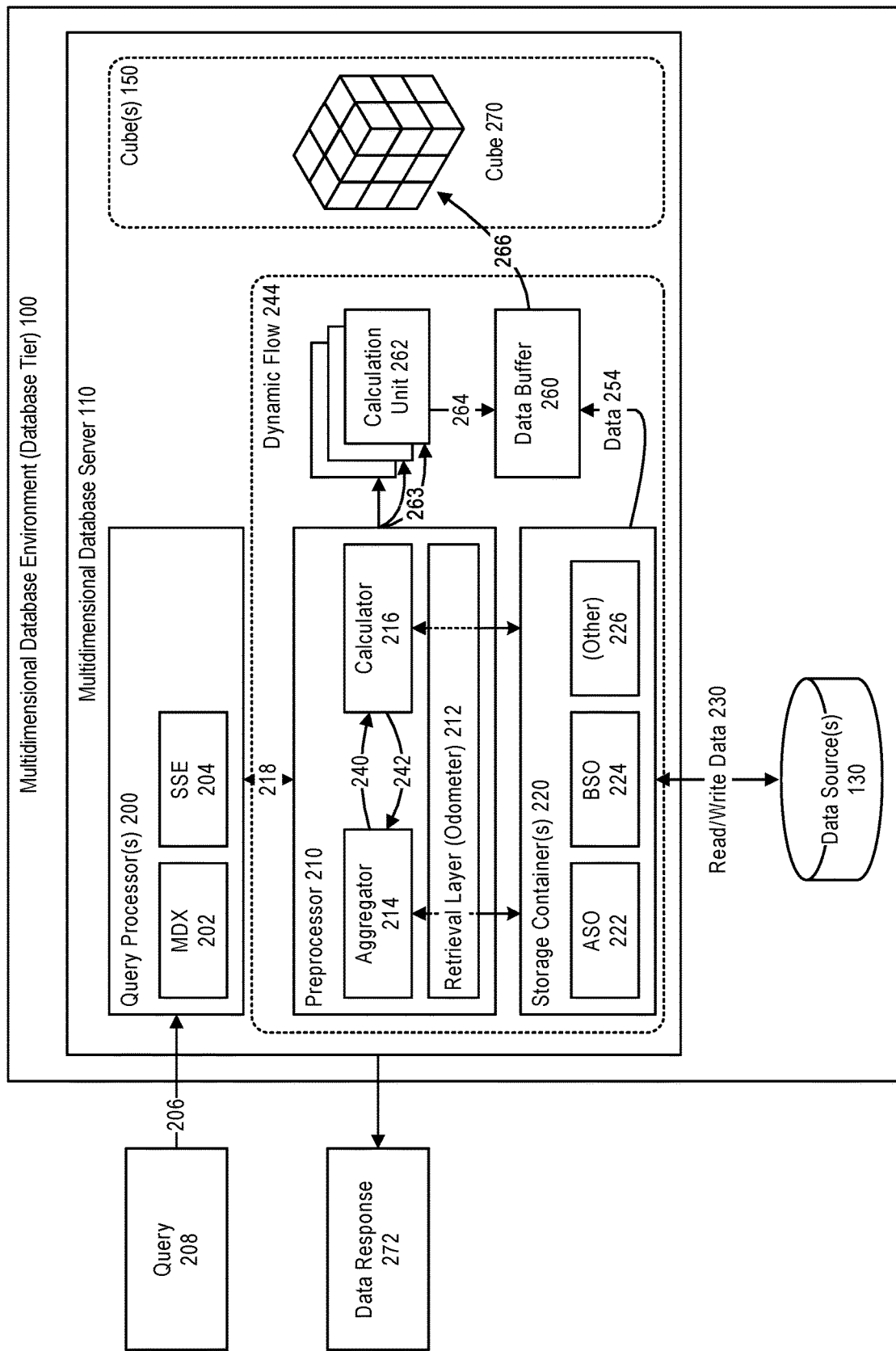
FIG. 5 further illustrates use of a dynamic flow with a multidimensional database, in accordance with an embodiment.

FIG. 5 further illustrates use of a dynamic flow with a multidimensional database, in accordance with an embodiment.

As illustrated in FIG. 5, in accordance with an embodiment, once the dynamic flow has been built, and has been processed to completion of a response, the preprocessor can create or otherwise populate 266 a database cube 270, and the data response 272 can be returned to the requesting client.

In accordance with an embodiment, the dynamic flow can support a variety of modes: including streaming and non-streaming modes, as further described below.

In accordance with an embodiment, in a streaming mode, each calculation unit includes two steps of execution, including that (a) each stored cell is processed according to a calculation unit logic (if it belongs to the unit) and the cell is returned to subsequent/next units and/or an output bucket, without a need for temporary storage; and (b) all calculated dynamic cells are then returned to next units and/or the output bucket.

Advantages of the streaming mode include the provision of a streaming interface; and efficient data processing (for example, there is no need for temporary storage of unused cells, the mode requires low memory usage, and each cell will be processed only in relevant units).

In accordance with an embodiment, in a non-streaming mode, each calculation unit stores all of its cells in a local temporary buffer, until all of the calculations are finished. Once all of the calculations are finished, then all calculated points are returned to the next unit, one-by-one (as in the streaming mode).

Advantages of the non-streaming mode include a simpler logic for the calculation units and their interactions.

Figure 6:
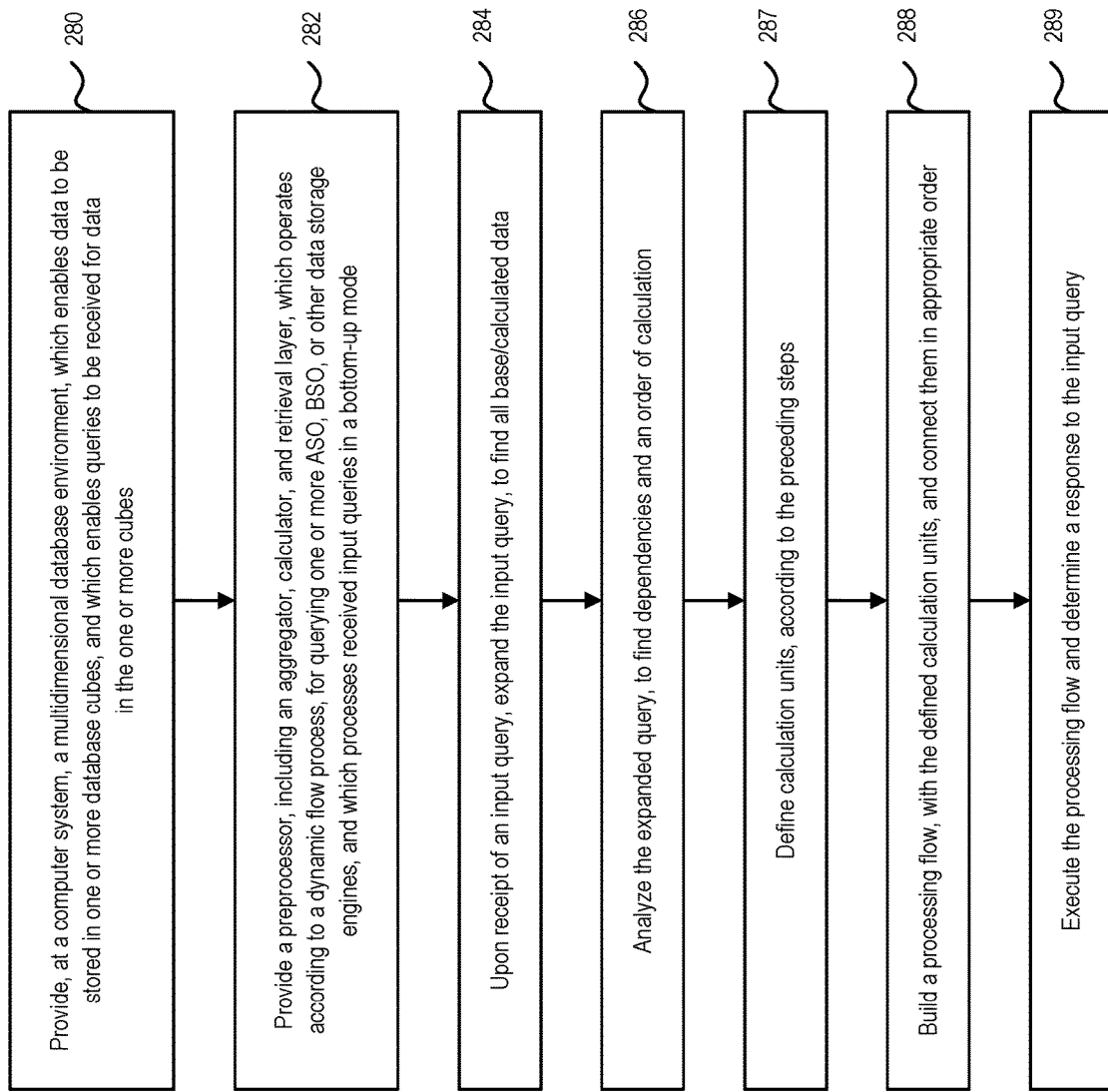
FIG. 6 illustrates a process for use of a dynamic flow with a multidimensional database, in accordance with an embodiment.

FIG. 6 illustrates a process for use of a dynamic flow with a multidimensional database, in accordance with an embodiment.

As illustrated in FIG. 6, in accordance with an embodiment, at step 280, a multidimensional database environment is provided at a computer system, which enables data to be stored in one or more database cubes, and which enables queries to be received for data in the one or more cubes.

At step 282, a preprocessor, including an aggregator, calculator, and retrieval layer is provided, which operates according to a dynamic flow process, for querying one or more ASO, BSO, or other data storage engines, and which processes received input queries in a bottom-up mode.

At step 284, upon receipt of an input query, the input query is expanded, to find all base/calculated data.

At step 286, the expanded query is analyzed, to find dependencies and an order of calculation.

At step 287, calculation units are defined, according to the preceding steps.

At step 288, a processing flow is built, with the defined calculation units and connecting them in appropriate order.

At step 289, the processing flow is executed, and a response to the input query is determined.

Odometer Retrieval

In accordance with an embodiment, the system supports bottom-up aggregation in a multidimensional database (e.g., Essbase) computing environment. A dynamic flow, coupled with a data retrieval layer or data fetching component (which in some environments can incorporate a kernel-based odometer retriever, or odometer that manages pointers to data blocks, contains control information, or otherwise acts as an array of arrays of pointers to stored members) enables bottom-up aggregation of cube data which, for example with pure aggregating queries, provides considerable run time improvement.

In a multidimensional database environment, aggregation provides several advantages, together with some consequences. Although a kernel-based component, such as an odometer, can fetch stored and partitioned cells and return them to a next calculation unit; with larger sparse dimensions, larger data sizes, and queries for non-stored members, the system may need to pass a large amount of data from the kernel to, e.g., an aggregator.

Dynamic members could be expanded, for example by producing rangesets of leaves' member numbers (memnos) for the dynamic members, followed by a merging of these rangesets into a single large rangeset, and providing that to the odometer retriever.

However, for each stored cell which the odometer retriever passes to the aggregator, the recipient aggregator must generally search for that cell's ascendants among many rangesets of dynamic members (of which there may in turn be a number of ascendants), and perform aggregations to these ascendants.

To address this, in accordance with an embodiment, a dynamic flow or process such as that described above, can be used to expand dynamic members down to a selection of aggregated members that are relatively easy to obtain.

In this manner, the system can reduce the amount of data that must be passed from the odometer retriever.

In accordance with an embodiment, the odometer can operate similar to an ASO-type flow, in that it need not output any cell, until all of the data is fetched.

Figure 7:
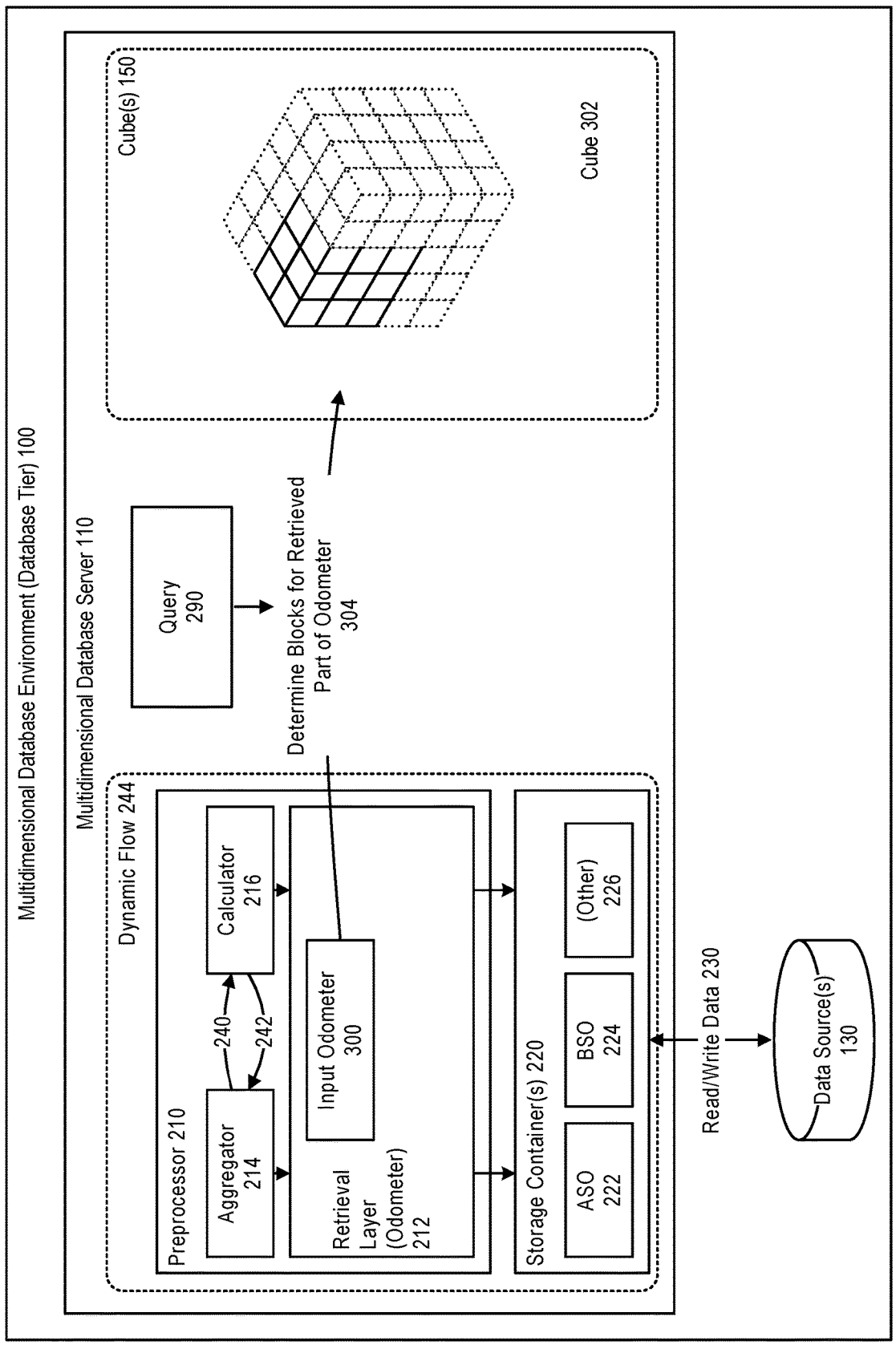
FIG. 7 illustrates bottom-up aggregation with a multidimensional database, in accordance with an embodiment.

FIG. 7 illustrates bottom-up aggregation with a multidimensional database, in accordance with an embodiment.

In accordance with an embodiment, the odometer retriever can be used with a BSO-type storage container, in which a multidimensional cube may be represented by smaller building blocks; and wherein a particular block either has data, or else there is no data in that particular block.

Since it would generally not be feasible to instantiate all possible blocks, a BSO-type storage container generally only creates those blocks that will contribute to the result.

In accordance with an embodiment, the odometer enables the database server to process an input query in a dynamic fashion, including determining quickly which of the blocks in a cube contribute to that input query.

For example, a query for cities in California may be processed to include only those California cities that will contribute values to the query.

In accordance with an embodiment, an input query can be represented, e.g. in MDX, and can be used to define a region within the multidimensional database. This region may be illustrated as a subset of a very large cube, with links to other regions or cubes within the larger cube. The odometer provides a means of obtaining data from the larger cube, in a process referred to herein as odometer expansion. The database server can then retrieve the data provided by the odometer expansion, from block storage, to respond to the input query.

As illustrated in FIG. 7, when an input query 290 is processed, an input odometer 300 is created, and the system determines the blocks within storage for a retrieved part of the odometer 304.

This first step can be processed relatively quickly, since the database server can touch the data and determine whether it contributes to the result. If so, the system starts accumulating that data.

Figure 8:
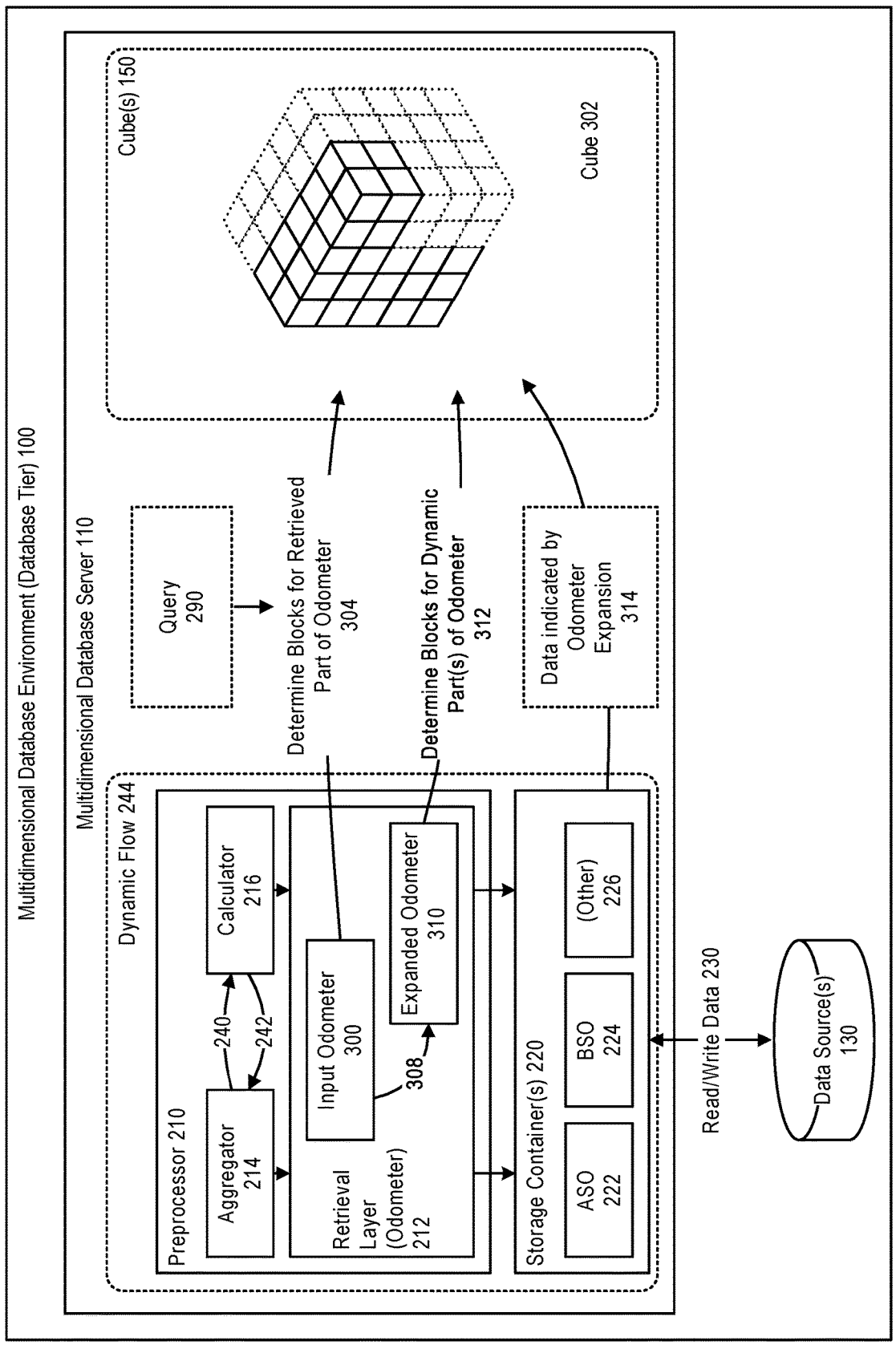
FIG. 8 further illustrates bottom-up aggregation with a multidimensional database, in accordance with an embodiment.

FIG. 8 further illustrates bottom-up aggregation with a multidimensional database, in accordance with an embodiment.

As illustrated in FIG. 8, odometer expansion is then used 308, to create an expanded odometer 310, including determining those blocks associated with the dynamic part(s) of the odometer 312.

Using the above approach, the odometer enables the system to scan block storage, retrieve appropriate blocks, and manipulate the numbers if necessary to produce the data asked for, which may not necessarily be the data scanned from storage.

In particular, in accordance with an embodiment, the odometer enables the system to determine which blocks in a block-oriented storage contribute to the odometer, and scan those blocks while calculating an upper level, to further determine potentially contributing blocks, in a bottom-up manner.

As illustrated in FIG. 8, in accordance with an embodiment, the data indicated by the odometer expansion 314 can then be determined within the cube, and provided as a response to the input query.

Support for Large Queries

In accordance with an embodiment, the system provides support for large queries in a multidimensional database (e.g., Essbase) computing environment. A kernel-based odometer retriever, or odometer that manages pointers to data blocks, contains control information, or otherwise acts as an array of arrays of pointers to stored members. When used with a dynamic flow, the approach enables the system to be used, for example to handle grid queries, Multidimensional Expressions (MDX) queries, or other types of queries in which the potential size of the query can be up to $2^{64}$ bits.

Figure 9:
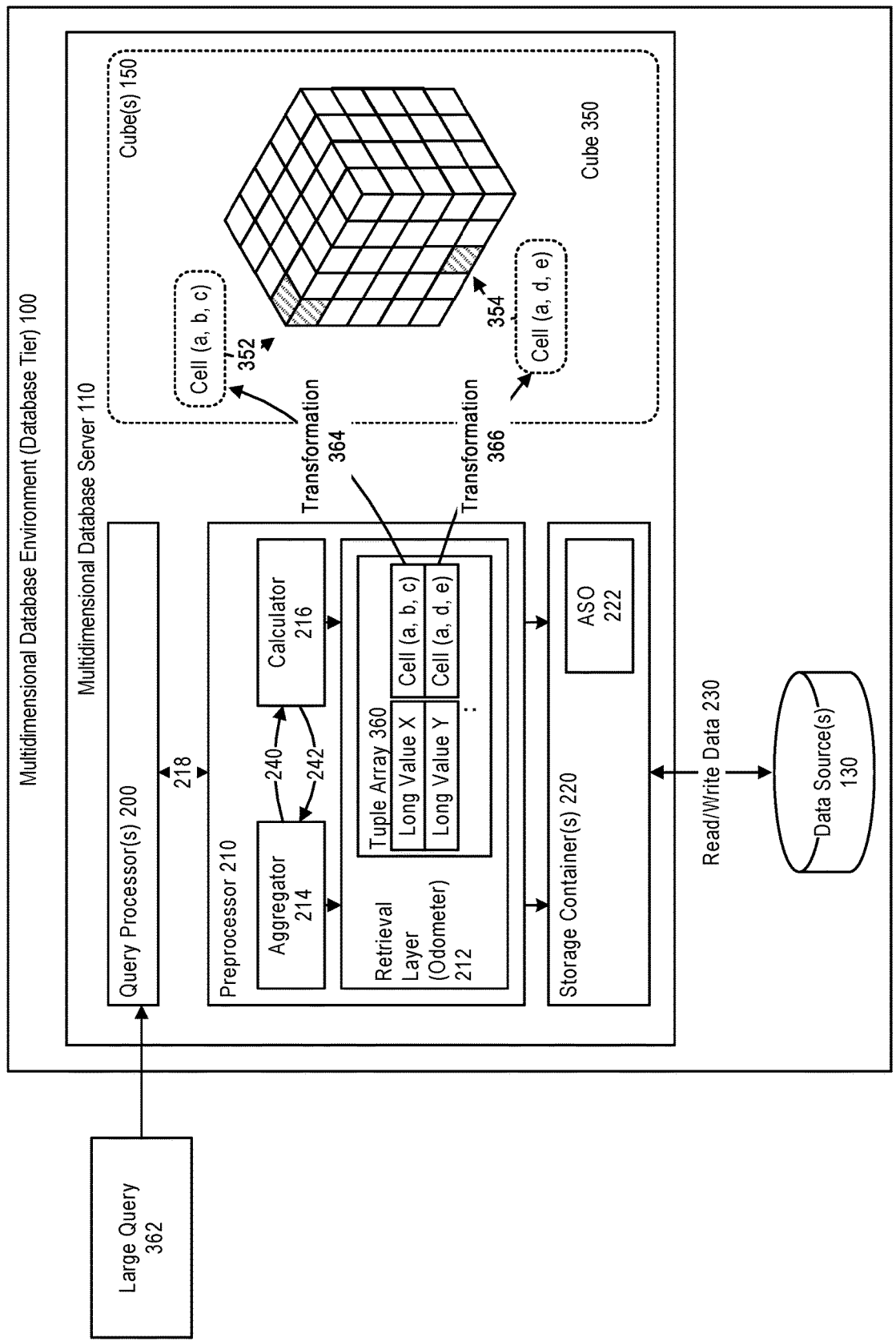
FIG. 9 illustrates support for large queries with a multidimensional database, in accordance with an embodiment.

FIG. 9 illustrates support for large queries with a multidimensional database, in accordance with an embodiment.

As described above, an odometer manages pointers to data blocks, contains control information, or otherwise acts as an array of arrays of pointers to stored members odometer; which enables the odometer, in response to an input query, scan the data within a multidimensional database to determine if the data is part of the odometer or not.

However, in an ASO-type storage container, each cell within a cube is represented by a long structure or value, for example (Tea, N.J., 2015) can be represented as (1, 1, 1). Each of these keys require an integer, generally 4 bytes, which means that the long value requires a total of 12 bytes, and the data storage requirements for such values can be quite large.

In accordance with an embodiment, the system is configured according to an algorithm or process that enables the odometer structure to have multiple entries. Instead of a simple long structure, the odometer provides an array of longs (e.g., 64 bit×64 bit×64 bit) that act as keys; and provides a transformation between this array of long keys, and the actual long values associated with the data cells.

As illustrated in FIG. 9, in accordance with an embodiment, data cells 352, 354 may be identified e.g., as long values (a, b, c), (a, d, e), etc.

In accordance with an embodiment, the odometer can include a tuple array 360 that allows mapping of an array of long keys (e.g., long X, long Y), to the corresponding data cells (e.g., a, b, c), which supports the processing of a large query 362, and provides transformations 364, 366 between the odometer and the cell structure.

Figure 10:
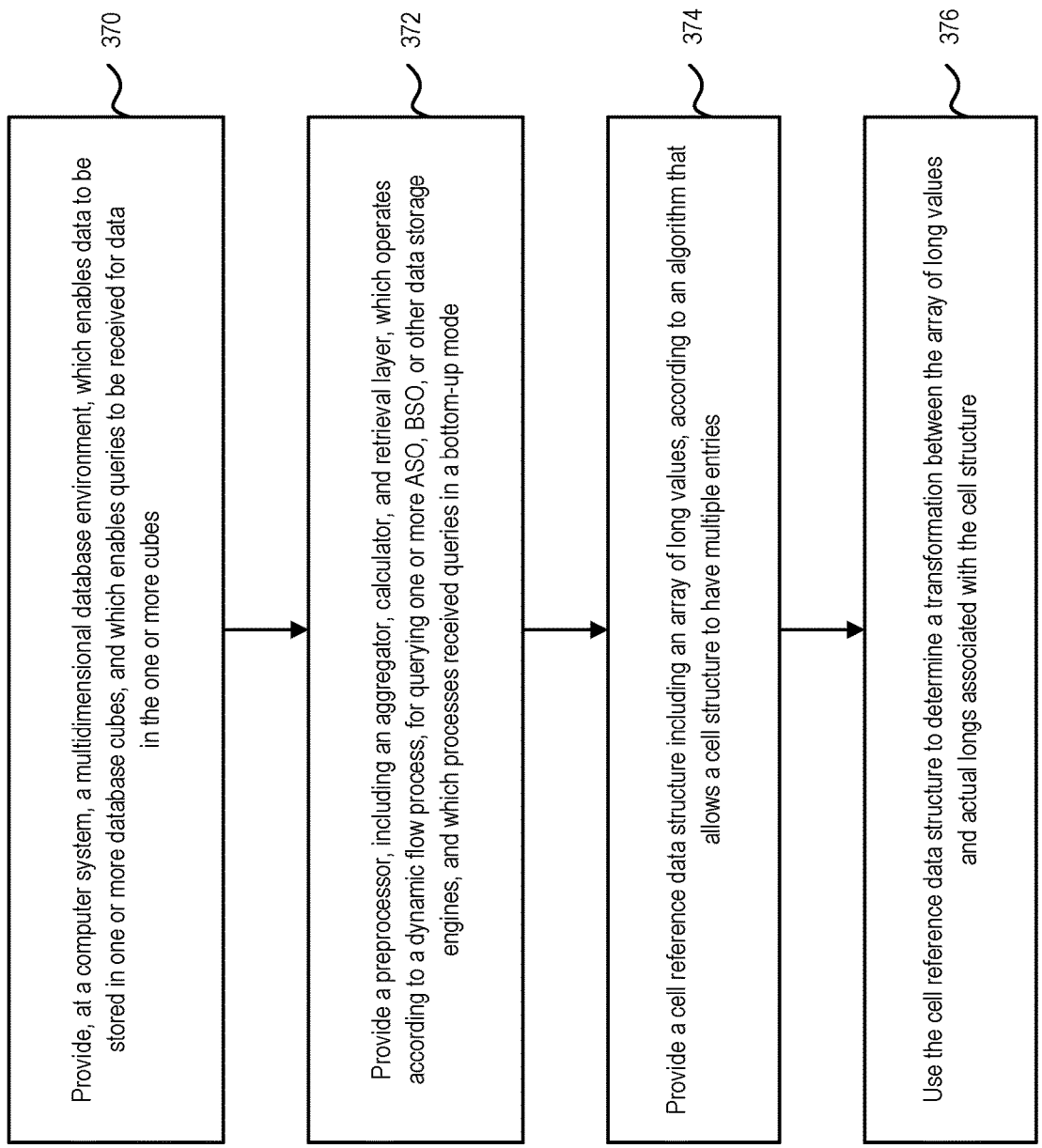
FIG. 10 illustrates a process for supporting large queries with a multidimensional database, in accordance with an embodiment.

FIG. 10 illustrates a process for supporting large queries with a multidimensional database, in accordance with an embodiment.

As illustrated in FIG. 10, in accordance with an embodiment, at step 370, a multidimensional database environment is provided at a computer system, which enables data to be stored in one or more database cubes, and which enables queries to be received for data in the one or more cubes.

At step 372, a preprocessor, including an aggregator, calculator, and retrieval layer is provided, which operates according to a dynamic flow process, for querying one or more ASO, BSO, or other data storage engines, and which processes received input queries in a bottom-up mode.

At step 374, a cell reference data structure is provided, including an array of long values, according to an algorithm that allows a cell structure to have multiple entries.

At step 376, the cell reference data structure is used to determine a transformation between the array of long values and actual longs associated with the cell structure.

Example Embodiment

In accordance with an example embodiment, the system can include or operate according to various functionality or functions described below. In accordance with other embodiments, other types of functionality or functions can be included.

UkrlSortedBuffer

In accordance with an example embodiment, this is a base class for storing a map of keys of the same width (ess_uint64_t[ ]) to key's value (double).

Odometer

In accordance with an example embodiment, an ASO odometer (AD_QXASOMEMBER_T) can be used for both ASO and Hybrid BSO cases. Having DIMNUM dim, MEMNUM mem and AD_QXASOMEMBER_Todom, the system can relate to weight of a member via odom[dim][mem].v.IRptWeight or odom[dim][mem].v.weightArr[ ], for non-repeating or repeating members respectively.

Odometer Allocation

In accordance with an example embodiment, there are two types of dimensions that the system identifies during formula compilation.

1. A set of expandable dimensions (typically dimensions which have dynamic/formula based members, or whose members participate in cross dimension formulas on another dimensions). These are ones, which are allocated using malloc, since when the system is expanding members, it can expand the odometer for this dimension, and realloc.
2. A set of non-expandable dimensions. In this case, the system knows from the start it is not going to add any members in the resulting odometer at start itself, so it can allocate using stack.

In accordance with an example embodiment, the system ensures that v.IRptWeight.arr points to a place with enough memory/width, and if not, allocates it accordingly.

There are some complications (like allocating on stack or on heap), splitting report to many odometers, expanding each odometer (using stack or heap), using microcubes, and sometimes having inner SELECT with a number of odometers.

In accordance with an example embodiment, when the system assigns a non-zero weight to a member, its .arr is allocated on heap using AD_QXASOWIDTHCHUNKS_T tctxp→wchunks (adQxwideUIntAlloc( )) and not freed until the whole query is done. Then EssWideUIntMdxStackChunksFree( ) frees the memory.

In accordance with an example embodiment, copying [arrays] of AD_QXMEMBER_T's is now done via adQxAsoMbrArrCopy( ).

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting large queries in a multidimensional database environment, comprising:
   a computer, including a processor; and
   a multidimensional database environment executing on the processor, including a multidimensional database for at least one of storage or analysis of data, the multidimensional database including a kernel-based data structure that manages pointers to data blocks, contains control information, and comprises an array of key values,
   wherein the multidimensional database is configured to process a query using the kernel-based data structure to maintain references to cells of the multidimensional database, wherein to process the query, the multidimensional database is further configured to determine a processing flow for one or more calculation units defined based on the query and connected according to an order and data dependencies, and execute the processing flow to determine a response to the query through execution of each of the one or more calculation units to calculate dynamic data according to the processing flow determined, wherein each key value in the array of key values is a reference to a cell of the multidimensional database, and wherein the kernel-based data structure provides a transformation for key values to fully-specified references to cells of the multidimensional database.

2. The system of claim 1, wherein the multidimensional database operates according to a dynamic flow process that processes the query by a hybrid use of at least two or more of block storage option, aggregate storage option, or other data storage containers concurrently.

3. The system of claim 2, wherein the dynamic flow process expands an input data structure as calculation units, for subsequent processing as one of a block storage option or an aggregate storage option process.

4. The system of claim 1, wherein the multidimensional database is configured to process the query with a bottom-up approach.

5. The system of claim 4, wherein the multidimensional database performs the steps of:
expanding the query; and
analyzing the expanded query to define the one or more calculation units.

6. The system of claim 1, wherein the key value is a long data type.

7. The system of claim 1, wherein the system is configured to process queries up to $2^{64}$ cells in size.

8. A method for supporting large queries in a multidimensional database environment, comprising:
providing, at a computer system including a processor, a multidimensional database environment, including a multidimensional database for at least one of storage or analysis of data, the multidimensional database includes a kernel-based data structure that manages pointers to data blocks, contains control information, and comprises an array of key values; and
processing, by the system, an input query using the kernel-based data structure to maintain references to cells of the multidimensional database, wherein processing includes determining a processing flow for one or more calculation units defined based on the query and connected according to an order and data dependencies, and executing the processing flow to determine a response to the query by executing each of the one or more calculation units to calculate dynamic data according to the processing flow determined,
wherein each key value in the array of key values is a reference to a cell of the multidimensional database, and
wherein the kernel-based data structure provides a transformation for key values to fully-specified references to cells of the multidimensional database.

9. The method of claim 8, wherein processing the input query includes processing the input query with a bottom-up approach.

10. The method of claim 9, wherein the bottom-up approach includes performing the steps of:
expanding the input query; and
analyzing the expanded input query to define the one or more calculation units.

11. The method of claim 8, wherein the system operates according to a dynamic flow process that enables processing of an input query and a hybrid use of at least one or more of block storage option, aggregate storage option, or other data storage containers.

12. The method of claim 11, wherein the dynamic flow process expands an input data structure as calculation units, for subsequent processing as one of a block storage option, or aggregate storage option process.

13. The method of claim 8, wherein the key value is a long data type, and
wherein the multidimensional database environment is configured to process queries up to $2^{64}$ cells in size.

14. A non-transitory computer readable storage medium, including instructions stored thereon which when read and executed by one or more computers cause the one or more computers to perform the method comprising:
providing, at a computer system including a processor, a multidimensional database environment, including a multidimensional database for at least one of storage or analysis of data, the multidimensional database includes a kernel-based data structure that manages pointers to data blocks, contains control information, and comprises an array of keys values; and
processing, by the multidimensional database environment, a query using the kernel-based data structure to maintain references to cells of the multidimensional database, wherein processing includes determining a processing flow for one or more calculation units defined based on the query and connected according to an order and data dependencies, and executing the processing flow to determine a response to the query by executing each of the one or more calculation units to calculate dynamic data according to the processing flow determined,
wherein each key value in the array of key values is a reference to a cell of the multidimensional database, and
wherein the kernel-based data structure provides a transformation for key values to fully-specified references to cells of the multidimensional database.

15. The non-transitory computer readable storage medium of claim 14, wherein processing the input query includes processing the input query with a bottom-up approach.

16. The non-transitory computer readable storage medium of claim 15, wherein the bottom-up approach includes performing the steps of:
expanding the input query; and
analyzing the expanded input query to define the one or more calculation units.

17. The non-transitory computer readable storage medium of claim 14, wherein the
wherein the system operates according to a dynamic flow process that enables processing of an input query and a hybrid use of at least one or more of block storage option, aggregate storage option, or other data storage containers.

18. The non-transitory computer readable storage medium of claim 17, wherein the dynamic flow process expands an input data structure as calculation units, for subsequent processing as one of a block storage option, or aggregate storage option process.

19. The non-transitory computer readable storage medium of claim 14, wherein the key value is a long data type.

20. The non-transitory computer readable storage medium of claim 14, wherein the multidimensional database environment is configured to process queries up to $2^{64}$ cells in size.

* * * * *